United States Patent [19]

Loftus

[11] 4,395,829

[45] Aug. 2, 1983

[54] PLUMB MEASURING DEVICE

[76] Inventor: William F. Loftus, 78 A Ridge Rd., Valley Cottage, N.Y. 10989

[21] Appl. No.: 298,163

[22] Filed: Aug. 31, 1981

[51] Int. Cl.³ .............................................. G01C 9/28
[52] U.S. Cl. ........................................ 33/352; 33/374
[58] Field of Search ................. 33/365, 351, 352, 353, 33/376, 374, 375, 377, 342

[56] References Cited

U.S. PATENT DOCUMENTS

| | | | |
|---|---|---|---|
| 472,345 | 4/1892 | Finmant | 33/376 |
| 1,294,856 | 2/1919 | Willis | 33/377 |
| 2,234,436 | 3/1941 | King | 33/374 |
| 3,648,378 | 3/1972 | Thingstad et al. | 33/374 |
| 4,035,923 | 7/1977 | Florczak | 33/374 |

Primary Examiner—William D. Martin, Jr.
Attorney, Agent, or Firm—Fisher, Christen & Sabol

[57] ABSTRACT

A plumb measuring device fabricated from a plurality of detachable modular assemblies includes a first assembly provided with an alignment bar, a scale plate pivotally mounted to the bar for determining the plumbness of a vertical surface, a bubble level attached to the scale plate to determine the level line of a vertical surface, indicia marked on the bar for reading the scale. A second scale plate is pivotally mounted just above the first scale plate for determining the degree of tolerance from plumb. A second modular assembly comprising interchangeable alignment bar extension members to be attached to either end of the bar for increasing the length of the measuring device. A third modular assembly comprising spacer means for detachable connection with the first or second assemblies to act as stand-offs to bridge distorted intermediate regions on a vertical surface. A compass is provided for attachment to the top of the first or second assembly for determining whether a driven pile has been rotated.

7 Claims, 8 Drawing Figures

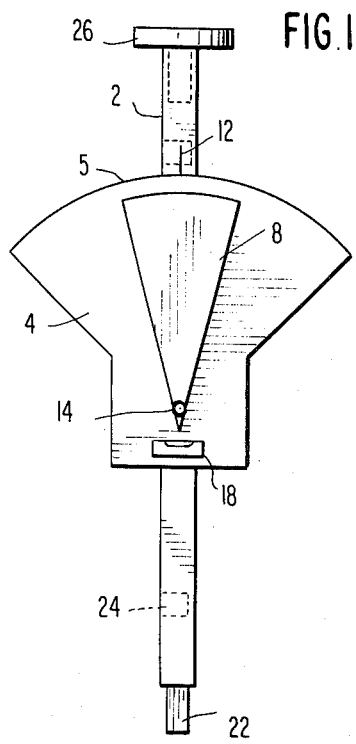
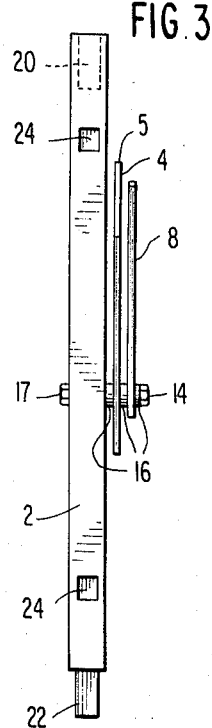
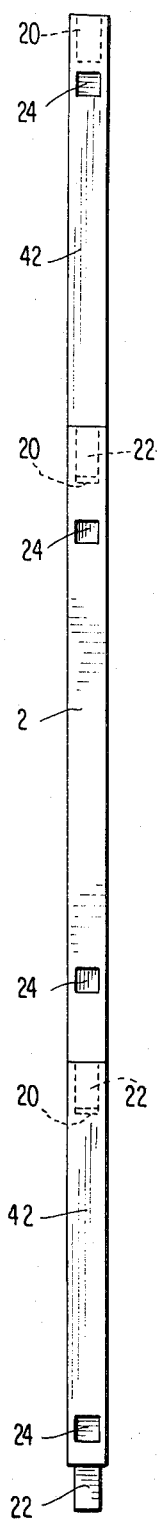
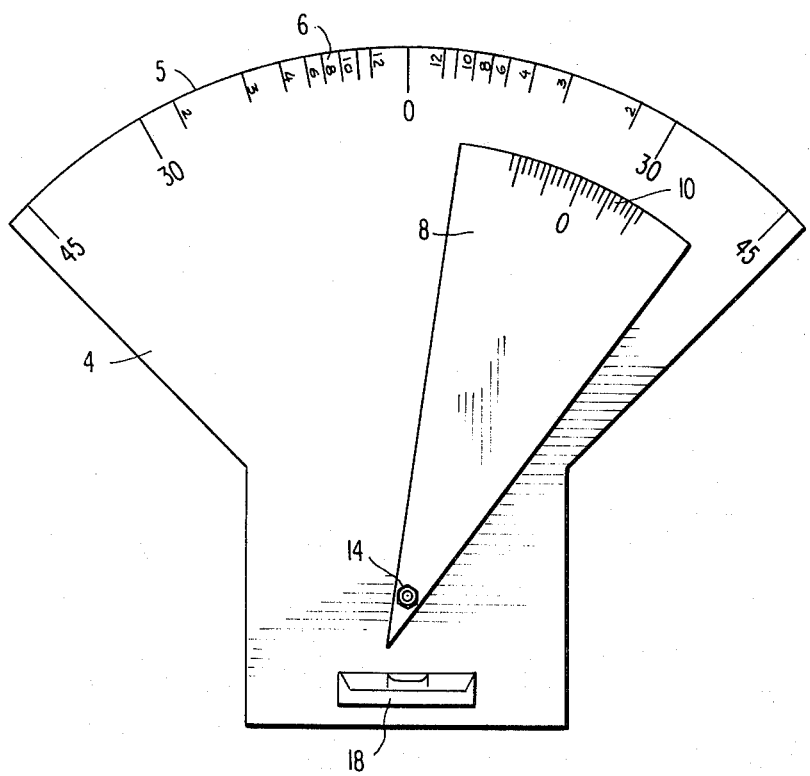

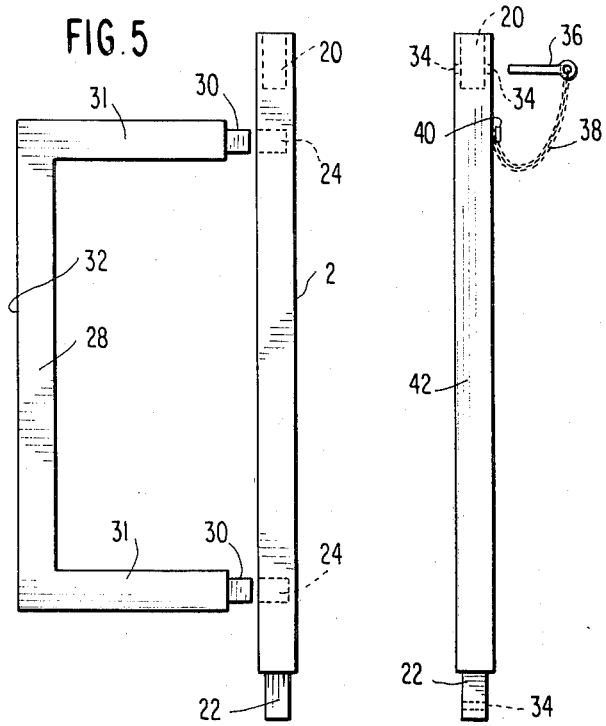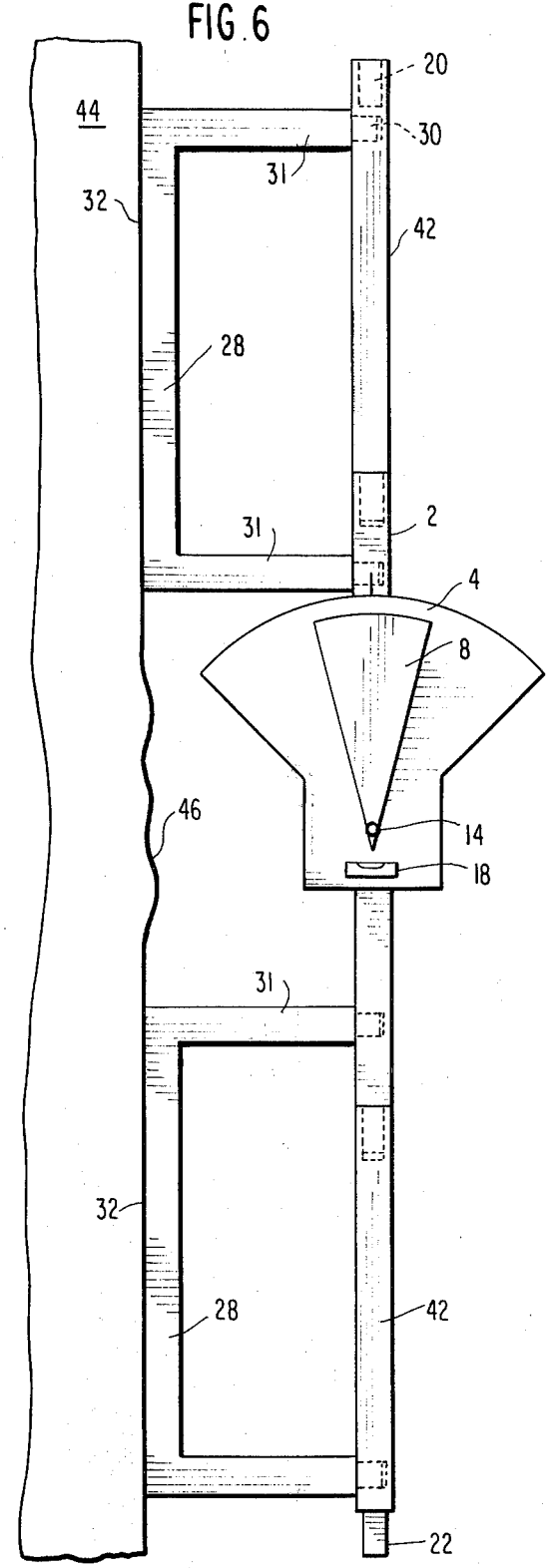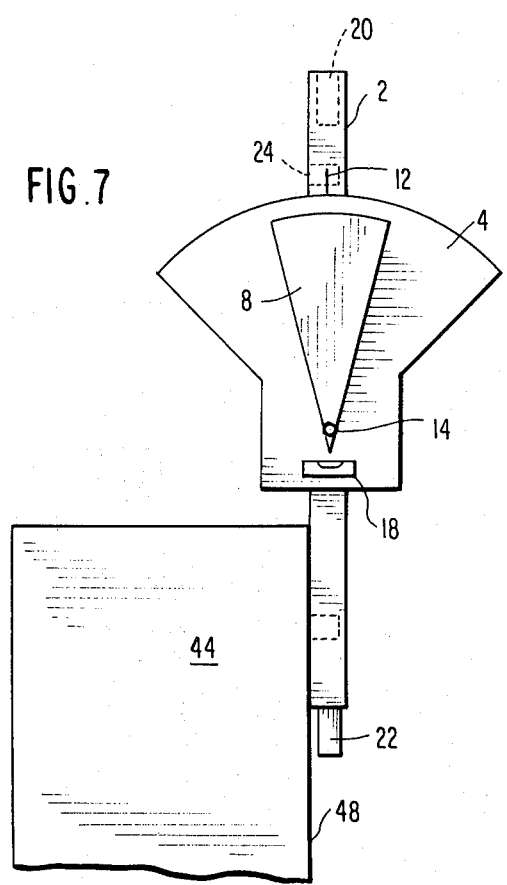

PLUMB MEASURING DEVICE

BACKGROUND OF THE INVENTION

1. Field of the Invention

This invention relates to improvements in clinometers. More specifically, it refers to an improved plumb indicating device for facilitating plumbing of vertical surfaces such as piles.

2. Description of the Prior Art

The plumbing of vertical piles is usually accomplished by the conventional plumb bob and line. The plumb bob has certain inherent disadvantages in that it must be in a motionless position before an accurate sighting can be made. If strong winds are present, the plumb bob must be sheltered to enable it to assume a motionless position. A further disadvantage of the plumb bob is that if the surface is uneven at intermediate points, e.g., driven piles tend to distort from straightness, or if it has projections, the plumb line must be positioned away from their distortions in order to hang in a vertical position.

An early plumb indicating device U.S. Pat. No. 2,807,888 to Thomas provided for lateral projections at each of its ends to bridge distortions in a vertical surface to be plumbed. This device however, is not provided with interchangeable extension members, nor does it provide for a plurality of scale plates for measuring the degree of plumbness of a surface. The present invention is also distinguishable from the Thomas reference in that it is provided with stand-off projecting members that have longer surface engaging portions to provide for a sturdier, more solid engagement between the device and the vertical surface to be plumbed. The present invention additionally provides for the attachment of scale plates to the extension members, and a compass may be attached to the top of the level bar or extension members for determining if any rotation of a pile has been realized.

U.S. Pat. No. 2,834,118 to Jackson discloses a clamp for vertically aligning poles which provides swinging pointers with scales for determining the plumb position, and also provides for off-setting the pointers from the center of the clamp to provide for irregularities in the pole. This device however fails to provide for extending the length of the device to facilitate the plumbing of longer vertical surfaces, nor does it provide for measuring the degree of tolerance, or for measuring the degree of rotation of a pile. The present device is further distinguishable in that it provides for a modular assembly, which can be dissembled with relative ease for ready storage. Additionally, the present invention provides for a much simpler operation in determining the plumbness of a vertical surface.

Another earlier device U.S. Pat. No. 700,326 to Hamel discloses a combined level-protractor, square and pitch board. It provided a scale plate pivotally mounted to a blade member held in position by a thumb nut. The device also provided a bubble level attached to the scale plate. The present invention is an improvement upon this device in that it provides for the attachment of spacer members to bridge distortions in a vertical surface, and provides interchangeable extension members to be attached to the device for increasing its length. It further provides a second scale for determining tolerances from vertical plumb, and a compass for determining whether any rotation has been realized.

It is believed that there are no devices in the prior art which are capable of providing the features of the present invention. Further advantages and improvements over the aforementioned references will become apparent from the discussion that follows.

SUMMARY OF THE INVENTION

The foregoing objects as well as other are achieved in accordance with my modular invention which comprises a first assembly consisting of an alignment bar member which vertically engages the surface to be plumbed, and has a scale plate pivotally mounted thereon. The scale plate is provided with a calibrated batter scale for determining the plumbness of a vertical surface. A conventional bubble level is attached to the scale plate for indicating the vertical. Indicia marked vertically on the center of the level bar member is provided adjacent the scale plates upper edges for reading the degree of plumbness of a surface. A second scale plate is provided which is pivotally mounted just above the first scale plate, which is provided with a scale of degrees on its upper edge for determining the degree of tolerance.

A second modular assembly comprising interchangeable level bar extension members are provided which are attached to either end of the level bar to increase the length of the measuring device to facilitate the plumbing of piles prior to being driven into the ground. The design is such that extension members may be attached to enable the device to be increased to whatever desired length is necessary to enable greater vertical distances to be plumbed.

A third modular assembly is provided comprising U-shaped spacer blocks for detachable connection with the first or second assembly which act as stand-offs to bridge distorted intermediate regions on the surface to be plumbed. A compass may be attached to the top of the bar member to enable the user to determine whether a driven pile has been rotated during driving.

The modular assemblies are designed to facilitate easy removal for ready storage.

A principal object of the invention is to provide an efficient plumb measuring device of compact, modular and durable construction which is capable of being manufactured economically so as to be available at relatively low cost to surveyors, engineers and other technicians who have need for an instrument of this nature.

Another object of the invention is to provide interchangeable level bar extensions to be attached to either end of the level bar to facilitate the plumbing of piles prior to being driven into the ground. The design is also such that, if desired, extension members may be attached to enable even greater vertical distances to be plumbed. Another object of the invention is to provide a device which includes attachable spacers for connection to either the level bar, or to the level bar extension to act as a standoff to bridge any distorted intermediate regions on a pile's surface.

Still another object of the invention is to provide a plumb measuring device which includes a compass attached to the end of the level bar to enable the user to determine whether the driven pile has been rotated.

Yet another object of the invention is to provide level bar extensions that are designed to have attached to them pivotable scales, thus standardizing the manufacturing process.

Another object of the invention is to provide a plumb measuring device which constitutes a rigid structure so that it is not affected by wind.

A further object of the invention is to provide a plumb measuring device which can be disassembled with relative ease for ready storage.

A better understanding of this invention as well as further features and advantages thereof will be had referring to the accompanying drawings.

BRIEF DESCRIPTION OF THE DRAWINGS

FIG. 1 is a front view of the invention illustrating the first assembly.

FIG. 2 is a detailed view of the pivotal scale plates of the first assembly.

FIG. 3 is a side view of the invention illustrating the first assembly.

FIG. 4 is a view illustrating the second assembly attached to the first assembly.

FIG. 5 is a view illustrating the third assembly.

FIG. 6 is a view of the invention illustrating the device bridging a distortion during operation of plumbing a surface.

FIG. 7 is a view of the first assembly illustrating the operation of plumbing a surface.

FIG. 8 is a view of the second assembly illustrating locking means.

DESCRIPTION OF THE PREFERRED EMBODIMENT

Referring to FIGS. 1, 2 and 3, the plumb measuring device 1 is shown as comprising a first assembly of the invention. The device includes an alignment bar member 2, a scale plate 4, a second scale plate 8 both pivotally mounted on the bar member by a bolt 14. The scale plates have holes (not shown) cut in them and when assembled as shown in FIG. 3 are mounted on the bolt 14 separated by washers 16. The bolt passes through a washer 16 followed by the second scale plate 8, followed by another washer 16, followed by the first scale plate 4, followed by another washer 16. The bolt than passes through the bar member 2 and is secured by means of a clamping nut 17.

As shown in FIG. 2 the scale plate 4 is provided with a calibrated batter indicator scale 6 for determining the plumbness of a pile or other vertical surface. The second scale plate 8 is provided with a scale of degrees 10 for determining the degree of tolerance from plumb of a pile or other vertical surface. A bubble level 18 is provided and is attached to the scale plate 4 for determining the level line of a pile or other vertical surface.

Indicia 12 marked vertically on the center of the bar member 2 is provided adjacent the scale plates upper edge 5, for reading the degree of plumbness of a vertical surface.

As shown in FIG. 1, a compass 26 may be attached to the top of the bar member 2 to enable the user to determine whether a driven pile has been subjected to rotation, an occurrence which is often prevalent after the driving of a pile.

As shown in FIG. 4, a second modular assembly 42 comprising interchangeable level bar extension members are provided which are attached to either end of the bar 2 to increase the length of the device to facilitate the plumbing of piles prior to being driven into the ground. It is to be understood that the level bar member 4, and the extension members 42 are of the same design and dimensions and are interchangeable. The extension members have a round narrowed tongue portion 22 at one end which is designed to fit resiliently within an elongated slot portion 20 at one end of the bar 2.

An elongated slot portion 20 is provided in the opposite end of the extension member 42 and is designed to resiliently receive a narrow tongue portion 22 at the opposite end of the bar 2. The design is such that the extension members 42, and the bar 2, are interchangeable, and that extension members may be attached to enable the device to be increased to whatever desired length is necessary to enable greater vertical distances to be plumbed.

As shown in FIG. 8 to provide for greater resiliency when extension members 42 are attached to the device 1, the elongated slot portions 20, and the narrowed tongue portions 22 are provided with narrow holes 34 cut horizintally through the centers thereof, so that when the extension members 42 are attached to the bar 2, the narrow holes are brought into alignment. A locking key 36 is provided which is designed to fit resiliently within the narrow holes 34 to provide locking means to the extension 42. A locking pin 40 is fitted horizontally into the extension means near the horizontal hole 34 provided with a securing chain 38 which is attached to the locking pin. The chain 38 is attached to the locking key 36 to enable the key to remain close at hand.

Often it is desired to make plumb reading on vertical surfaces that are distorted or roughened. As illustrated in FIGS. 5 and 6, a third modular assembly 28 is provided to enable the device to bridge distorted intermediate regions 46 on the surface to be plumbed. The third modular assembly comprises an attachable substantially U-shaped member 28 having at both ends a narrow tongue portion 30 adapted to fit resiliently within apertures 24 in the bar 2. The narrow tongue portions 30 project outwardly defining larger diameter portions 31. A surface engaging portion 32 extends between the larger portions 31 at right angles to act as a stand-off bridging distorted intermediate region 46 on a surface, as seen in FIG. 6. It is to be understood that the stand-off 28 may be attached to either the bar 2 or the extension member 42.

In use, the plumb measuring device functions in the following manner, viewing FIG. 7 which illustrates the plumbing of a pile after it has been driven. The bar 2 is lined up with its axis parallel to the axis of the vertical surface to be plumbed 48. The scale plate 4 is then pivoted until the bubble level 18 indicates a level reading. The plumbness of the vertical surface is then read on the scale 4 as indicated by the calibrated batter scale 6 as read on the indicia 12. The calibrated batter scale is read as 1 on 3, or 1 on 4, etc. The first number indicates how many inches of which the second number is the multiplicant, e.g. 1 on 3 means a slope of 4" horizontal on 12" vertical.

The second scale plate 8 may be pre-set before reading the plumbness of the vertical surface. The second scale plate is marked in degrees 10, and is designed to enable the user to determine the degree of tolerance from plumb. The compass 26 attached to the bar 2 can be utilized to determine the degree from magnetic north a pile is prior to being driven, and then can be read after the driving, to determine if the pile has rotated, and to what degree.

As illustrated in FIG. 6, the device is utilizing the level bar extension members 42 and the stand-offs 28, as previously described. The extension members are used to increase the length of the measuring device to enable greater vertical distances to be plumbed. An example where the user would wish to increase the length of the device would be when the user wants to check the attitude of a pile prior to driving.

As shown, the pile 44 has distortions 46 on its intermediate surface. To bridge these distortions, the standoff members 28 are attached, as previously described to the bar extensions 42. If the distortions were prevalent farther up the pile 44, then the use of several extensions to bridge the distortions would be necessary. The plumbness of the pile, the degree of tolerance, and the degree of rotation of a pile, are then determined as previously described.

Having described the preferred embodiments of the invention it is to be understood that the invention is not limited thereto, but may be otherwise embodied within the scope of the following claims.

What is claimed is:

1. A plumb measuring device for measuring the plumbness of a vertical surface, said device comprising:
   (a) a bar member having a flat surface adapted to be aligned with said vertical surface, said bar member also having attaching means at each end of said bar member for attachment of bar extensions to increase the length of said bar member and having first and second spaced apart receiving means spaced inwardly from the ends of said bar member;
   (b) a scale plate pivotally mounted on said bar member at a pivot point, said scale plate being provided with a calibrated indicator scale on the upper edge thereof for determining the plumbness of said vertical surface;
   (c) a bubble level attached to said scale plate to determine the level line of said scale plate;
   (d) indicia marked on said bar adjacent said scale plate's upper edge for reading the scale on said plate, and
   (e) U-shaped spacer means for detachable connection to said bar member to act as a stand off, said U-shaped spacer means being formed with an intermediate portion having a plane surface parallel to said flat surface of said bar member and adapted for alignment with said vertical surface to be measured and having two spaced apart legs extending in the same plane from said intermediate portion and terminating in free ends which are formed with connecting means that are spaced apart a distance substantially equal to the distance at which said receiving means on said bar member are spaced apart to permit engagement of each connecting means with a receiving means and connection of said spacer means to said bar member.

2. The invention recited in claim 1 wherein said measuring device is provided with a bar extension having cooperating attaching means at each end thereof cooperating with the attaching means at one end of said bar member for attachment of said bar extension to said bar member to increase the length of said bar member, said bar extension being formed with third receiving means which is spaced from the connecting means of the bar member adjacent the end to which the bar extension is connected a distance substantially equal to the distance at which said first and second receiving means on said bar member are spaced apart to permit engagement of each connecting means of said spacer with the first or second receiving means and the third receiving means.

3. The invention recited in claim 1, wherein said measuring device is provided with an upwardly facing compass attached at the top end of the bar member thereof.

4. The invention recited in claim 2, wherein said attaching means at one end of said bar extension comprises a round narrowed tongue portion adapted to fit resiliently within a socket forming the attaching means at one end of said bar member, and said attaching means at the other end of said bar extension is a socket adapted to resiliently receive a narrow tongue portion forming the attaching means at the other end of said bar member.

5. The invention recited in claim 4, wherein said round narrowed tongue portions and said sockets are provided with narrow holes cut horizontally through the centers thereof, so that when said extension bar is attached to said bar member, said narrow holes are brought into alignment and a locking key is provided to fit within said narrow holes to lock said extension bar to said bar member.

6. The invention as recited in claim 1, wherein the connecting means on said spacer are each narrowed tongue portions and the receiving means on said bar member are sockets adapted to resiliently receive said tongue portions at the ends of said spacer.

7. The invention as recited in claim 1, wherein first and second spacer means as defined in claim 1 are provided and first and second bar extensions are provided wherein each is formed with attaching means for connection with each end of said bar member to extend said bar member from each end thereof, each bar extension being formed with a third receiving means for receiving the connecting means of said spacers the distance between the receiving means on the first bar extension and on the bar member adjacent the end to which said first bar extension is attached being substantially equal to the distance at which the receiving means on said bar member are spaced and the distance from the receiving means on said second bar extension to the receiving means of said bar member adjacent the end to which said second bar extension is connected is substantially equal to the distance that the receiving means on said bar member are spaced apart.

* * * * *